UNITED STATES PATENT OFFICE.

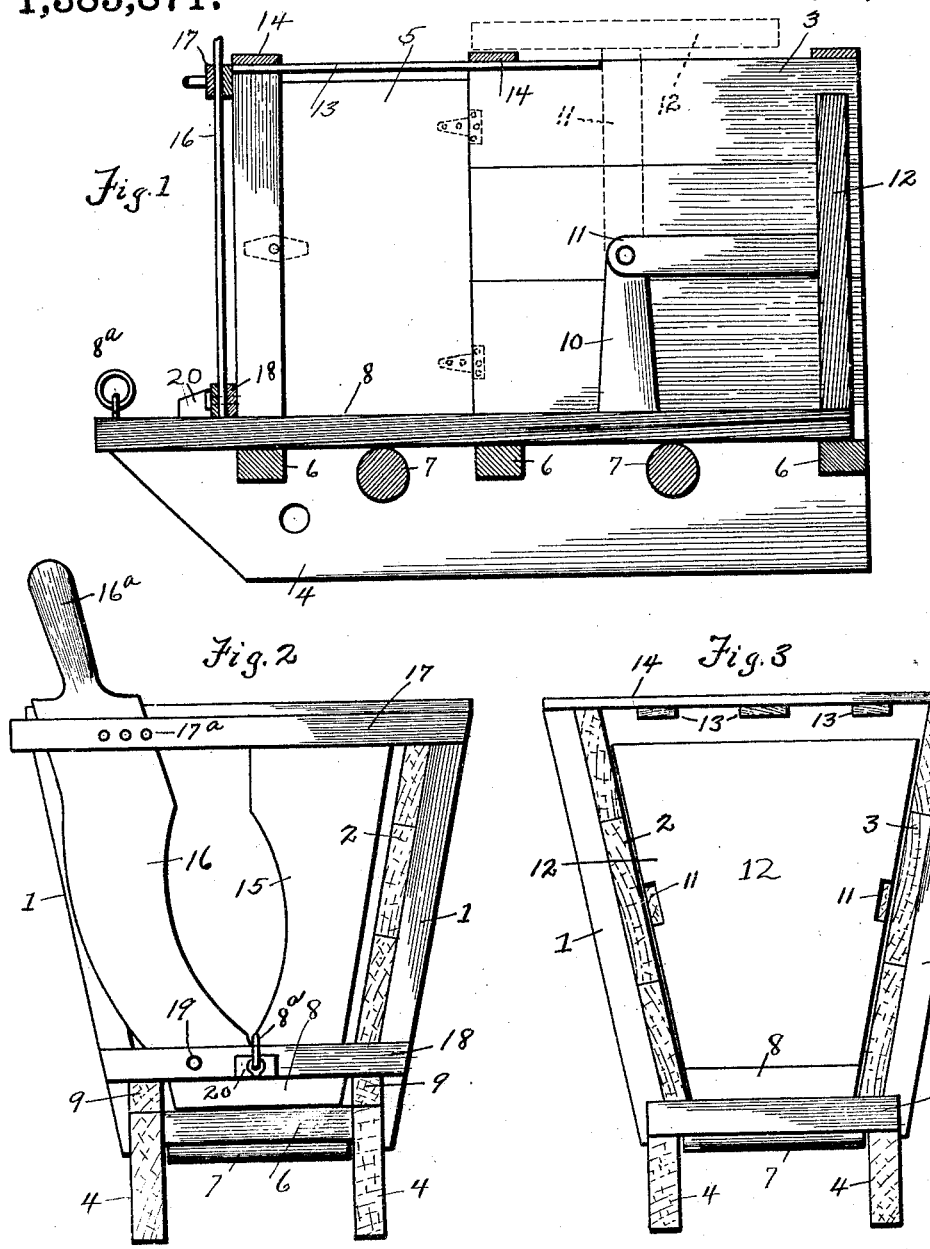

ALFRED HIDY, OF JEFFERSONVILLE, OHIO, ASSIGNOR OF ONE-HALF TO JOHN H. HIDY, OF URBANA, OHIO.

HOG-BOX.

1,385,871.    Specification of Letters Patent.    Patented July 26, 1921.

Application filed October 27, 1919. Serial No. 333,444.

*To all whom it may concern:*

Be it known that I, ALFRED HIDY, a citizen of the United States, residing at Jeffersonville, in the county of Fayette and State of Ohio, have invented certain new and useful Improvements in Hog-Boxes, of which the following is a specification.

My invention relates to improvements in boxes for confining hogs for the purpose of ringing or other operations.

An object of my invention is to devise a box of the character referred to which will be simple in its construction, economical in manufacture and effective for the purpose for which it is designed.

A further object of my invention is to provide a structure of this character, the end gate of which is so designed as to be used as a cut-off to prevent the entrance of more than one hog at a time into the box.

A further object of my invention is to provide an arrangement for resisting the efforts of the hog to release its head from the clamping device at the forward end of the box.

Other objects of my invention will appear from the accompanying drawings and description.

In the drawings:—

Figure 1 is a longitudinal section of a structure embodying my improvements.

Fig. 2 is a view of the forward end of the same.

Fig. 3 is a view of the rear end of the same.

Referring to the drawings, 1 represents upright posts, to the inner sides of which are secured the sides 2 and 3 of the structure, the posts having their lower ends secured to runners 4. The side 3 is provided with a door 5 at the forward end thereof to permit egress of the animals after being operated upon.

The runners 4 are connected by cross-strips 6 and also have journaled therein a pair of rollers 7 upon which is mounted a floor 8. The runners are preferably extended beyond the forward end of the box, the upper edges of the extended ends having secured thereto strips 9 to form guides for the floor, the floor being otherwise guided by the lower edges of the side walls.

Secured to the floor near the rear end thereof are two upright posts 10, to the upper ends of which are pivoted rearwardly-extending arms 11 having their free ends connected to an end gate 12. The forward end of the top of the structure is covered by slats secured to cross pieces 14, leaving the top open at the rear so that the end gate 12 may be swung to the position shown in dotted lines in Fig. 1 to allow a hog to be driven into the box and again swung to the position shown in full lines to close the rear end of the box.

Located at the forward end of the box are two head clamping members 15 and 16. The clamping member 15 is stationarily secured to an upper slotted bar 17 and also to a lower slotted bar 18 secured to the forward upright 10. The clamping member 16 is movable, the lower end being pivoted as at 19 in the slotted portion of the lower bar 18, while the upper end thereof is free to slide in the slotted portion of the bar 17, being provided with a handle portion $16^a$. The adjacent edges of the clamping members are concaved so as to conform to the neck of the hog.

In the operation of the device, the box is placed in proximity to the door of a pen in which may be confined a number of hogs, and so soon as one hog has been driven into the box the end gate 12 is thrown down to closed position to shut off any attempt of another hog crowding into the box. The floor is then rolled forwardly on the rolls 7 until the head of the hog is forced between the clamping members so that it may be clamped by the movable member 16; a series of openings $17^a$ being provided in the bar 17 to register with corresponding openings in the clamping member 16 so that a pin may be inserted to hold the clamping member 16 in different positions of adjustment. If desired, the forward end of the floor 8 may be provided with a ring $8^a$ to which is attached a rope for the purpose of pulling the floor, and this ring, abutting a block 20, also acts as a stop against rearward movement of the floor beyond a certain limit. By reason of the movable floor, which is unconfined in its movement in either direction after it has been moved forwardly to a position whereby the head of the hog may be secured, the hog is unable to brace himself for the purpose of attempting to pull its head out of the clamp, as the strain of the feet of the hog upon the floor only tends to cause the floor to move forwardly and the end gate 12 consequently to have a tendency to shove the hog forwardly.

It will be noted that the side walls and their supports flare outwardly so that the structure is wider at the top than at the bottom. In certain operations it is desirable to lay the box on its side and by having the sides so formed, a more comfortable position for the hog is obtained when the box is so placed. Also, it will be noted that the end gate closes the open portion of the top when it is swung upwardly to the dotted line position so that when the box is laid on its side the end gate assists the top in confining the hog. In this position of the box, one of the hind legs of the hog is preferably secured to a ring, not shown, on one of the sides of the box to assist in holding the hog in position.

Having thus described my invention, I claim:—

1. In a structure of the character described, a floor, side walls, a top partially covering said structure but leaving the rear thereof open, and a pivoted end gate arranged to swing upwardly and aline itself with said top to close the open portion of said structure.

2. In a structure of the character described, outwardly flaring side walls, a floor movable longitudinally of the structure, a clamping device at the forward end of said structure, a pivoted end gate supported at the rear end of said floor, and a pair of runners supporting said parts, all of the parts being confined within the side walls so that the structure may be laid on its side so as to rest in an inclined position, supported by one of said runners and the upper portion of one of said sides.

In testimony whereof, I have hereunto set my hand this 13th day of October, 1919.

ALFRED HIDY.

Witnesses:
HERBERT MOCK,
U. G. CREAMER.